United States Patent [19]

Osawa

[11] Patent Number: 4,530,387
[45] Date of Patent: Jul. 23, 1985

[54] SPIDER HUB AND A WHEEL RIM ASSEMBLY

[75] Inventor: Shigeru Osawa, Tokyo, Japan

[73] Assignee: Topy Industries, Limited, Tokyo, Japan

[21] Appl. No.: 418,072

[22] Filed: Sep. 14, 1982

[30] Foreign Application Priority Data

Nov. 10, 1981 [JP] Japan .................. 56-179998

[51] Int. Cl.$^3$ .................................. B60C 15/02
[52] U.S. Cl. ........................... 152/410; 152/396
[58] Field of Search ............ 152/398, 410, 411, 396; 301/11 R, 18-24, 10 R

[56] References Cited

U.S. PATENT DOCUMENTS

| | | | |
|---|---|---|---|
| 1,063,500 | 6/1913 | Bosworth | 301/24 X |
| 1,342,622 | 6/1920 | Bryant | 301/22 |
| 1,735,290 | 11/1929 | Meyer et al. | 301/22 X |
| 1,860,001 | 5/1932 | Vanderveer | 301/22 X |
| 3,007,742 | 11/1961 | Walther, Sr. | 301/20 |
| 3,013,842 | 12/1961 | Walther | 301/20 |
| 3,039,824 | 6/1962 | Walther | 301/20 |
| 3,043,358 | 7/1962 | Scott | 152/410 |
| 3,160,442 | 12/1964 | Walther et al. | 152/410 X |
| 3,372,957 | 3/1968 | Taylor | 301/18 |
| 3,623,530 | 11/1971 | Beyers et al. | 152/410 |
| 3,882,919 | 5/1975 | Sons, Jr. et al. | 152/410 |

Primary Examiner—Robert B. Reeves
Assistant Examiner—Russell D. Stormer
Attorney, Agent, or Firm—Fleit, Jacobson, Cohn & Price

[57] ABSTRACT

In a cylindrical surface of a gutter band of a wheel rim and a cylindrical surface of a spider hub opposed to one another, a conical surface is formed on one side of the cylindrical surface of the gutter band or that of the spider hub, or on both respectively. A wedge member is inserted between the formed conical surface and the cylindrical surface, or the formed conical surfaces, thereby forming a spider hub and wheel rim assembly.

5 Claims, 6 Drawing Figures

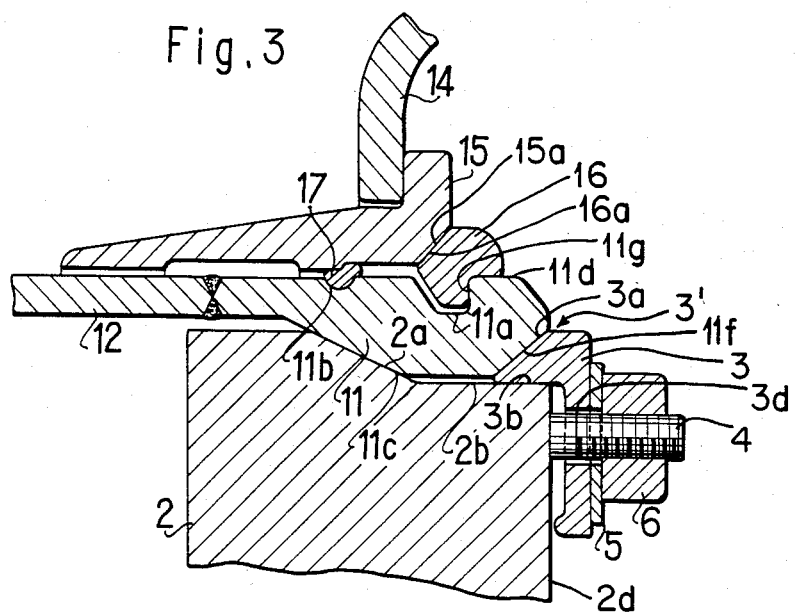
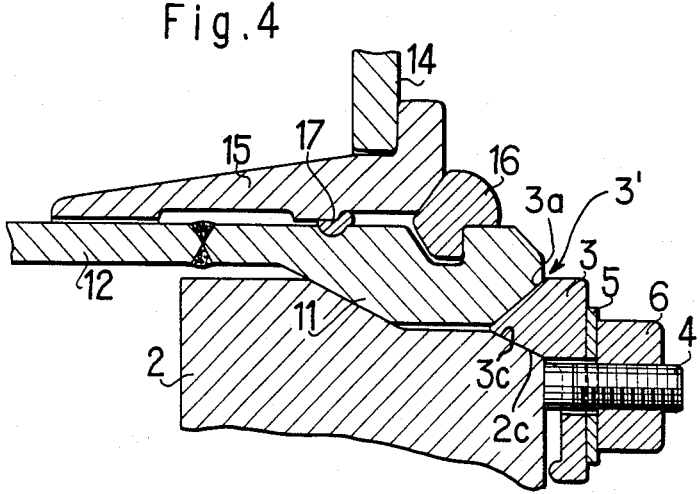

4,530,387

SPIDER HUB AND A WHEEL RIM ASSEMBLY

BACKGROUND OF THE INVENTION

This invention relates to a wheel and hub assembly of the flange-removable type for multiple-piece wheel rims and spider hubs. Heretofore, in an assembly for such multiple-piece wheel rims and spider hubs, a wheel rim 1 is, as shown in FIG. 1 and FIG. 2, comprised of a cylindrical rim base 10 having a cylindrical, cantilevered gutter band 11, a center band 12 and a back-flange 13 which abuts a side flange 14; an annular split locking ring 16 having an upper conical outer edge 16a which fixedly holds an annular body shown generally at 18 formed by an annular side flange 14 and and an annular bead seat band 15, having an upper conical outer edge 15a so that it is not drawn outwardly; and a sealing ring of packing material to prevent the escape of air. The gutter band 11 in said rim base 10 is provided with an inner conical surface 11c having 28° of inclined angle on one side of the inner surface thereof. The wheel rim 1 is adapted to be positioned concentrically around an axial line X—X' of a spider hub 2, abutting said spider hub 2 on an inner conical surface 2a provided along the outer circumference thereof thereby pressing the side of the gutter band 11 by the aid of a clamp bolt 4, a washer 5 and a nut 6 to joinedly assemble it with the spider hub 2.

In such rim structure however, as shown in FIG. 2, a side pressure S acts on a jaw portion 11g of a gutter 11a in the gutter band 11 through a side flange 14, a bead seat band 15 and the locking ring 16 when an air pressure is added after setting a tire on the rim, and further, a vertical load F acts on a gutter edge portion 11d due to the load of the weight of a car, whereby an excess of stress acts on a corner of the gutter 11a repeatedly resulting in the causation of a crack (a).

SUMMARY OF THE INVENTION

In view of this defect-proneness, this invention has as an object, to improve the strength and safety of such assemblies. In other words, this invention seeks to provide a wheel and hub assembly comprised of a spider hub and a wheel rim wherein the defect-proneness of the prior art is overcome by forming a conical surface 11f on one side of a cylindrical surface 11e of the gutter band 11 of a wheel rim 1 or a cylindrical surface 2b of the spider hub 2 or on both sides respectively and opposite one another, and inserting a wedge member 3' therein to reduce stress.

BRIEF DESCRIPTION OF THE INVENTION

FIG. 3 is a sectional view showning one example of a multiple-piece wheel rim and spider hub assembly in accordance with this invention.

FIGS. 4 through 6 are also sectional views of other embodiments of this invention.

DETAILED DESCRIPTION OF THE INVENTION

The details of this invention will be hereinafter described with reference to the accompanying drawings, FIG. 3 to FIG. 6.

Figure 1:
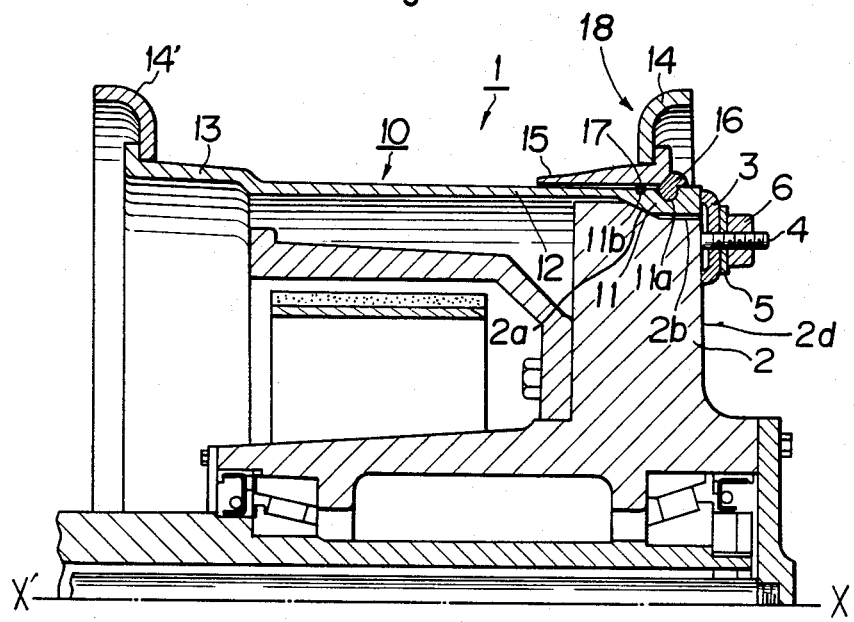
FIG. 1 is a sectional view which shows an assembly of the prior art composed of a traditional multiple-piece wheel rim and a spider hub.

The same parts as shown in the prior art example (FIGS. 1 and 2) are shown with the same numerals. Each drawing, FIGS. 3 to 6 is an embodiment of this invention which shows a wheel rim and spider hub assembly.

Figure 2:
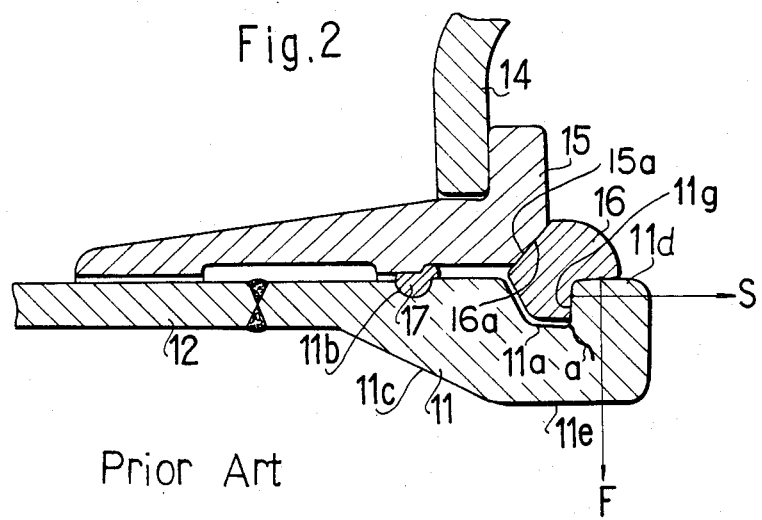
FIG. 2 is an enlarged sectional view of a portion of FIG. 1.

FIG. 3 is a sectional view of an embodiment thereof, wherein concerning the wheel rim 1, an outer conical surface 11f (see FIG. 3) is provided on the inner cylindrical surface 11e of the gutter band 11 shown in FIG. 2. Concerning the portions of the wheel rim 1, a gutter 11a for seating an annular split locking ring 16 and a sealing ring 17 of packing ring gutter 11b for inserting a sealing material therein are provided on the outer circumference of the gutter band 11 the same as heretofore. Further, on the inner surface of the gutter band 11 is provided an inner conical surface 11c for abutting oppositely with an inner conical surface 2a of the spider hub 2 and said conical surface 11f which constitutes a part of this invention. The spider hub 2, attached to an axle of a vehicle, is provided with an inner conical surface 2a having an equivalently inclined angle with that of the inner conical surface 11c of the gutter band 11 on the inner side, an outer cylindrical surface 2b parallel to the axial line of the hub 2 and connected with said conical surface 2a, and a plurality of clamp bolts 4 positioned outwardly from said vehicle and around the whole circumference of a front face 2d of said spider hub 2.

The wheel rim 1 is co-axially inserted around the spider hub 2 to abut the inner conical surface 11c thereof with the inner conical surface 2a of the spider hub 2, and a plurality of letter-L-form (i.e., L-shaped) clamp pieces 3, wherein each said clamp piece 3 has a wedge member shown generally at 3' having a conical surface 3a having the same inclined angle as outer conical surface 11f of the gutter band 11 and an inner cylindrical surface 3b abuttable to the outer cylindrical surface 2b of the spider hub 2, which are respectively inserted between the wheel rim 1 and the spider hub 2 so as to press upon the wheel rim 1, each said clamp piece 3 having a hole 3d for receiving one of a plurality of clamp bolts 4 and being clamped with a nut 6 through a washer 5 to assemble said wheel rim 1 and said spider hub 2.

FIG. 4 is a sectional view which shows another embodiment of this invention, wherein the abutting outer surface of the spider hub 2 against a conical surface 3c of clamp piece 3 is also provided with an outer conical surface 2c.

Figure 5:
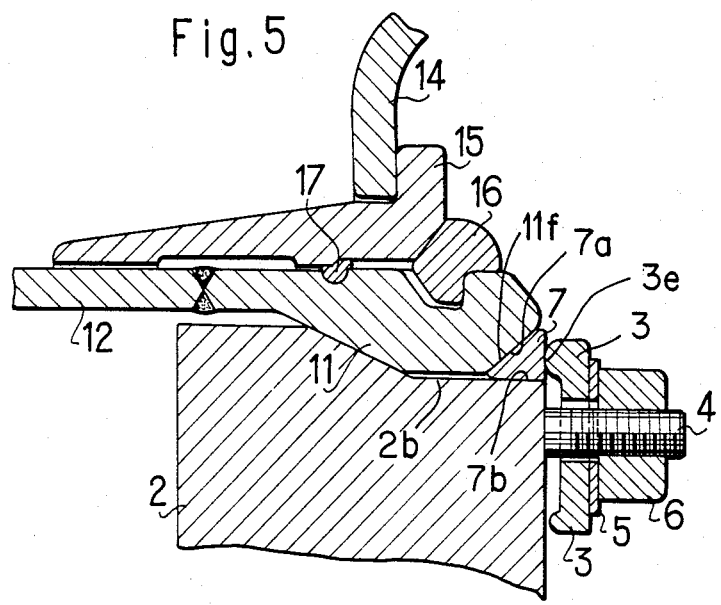
Figure 6:
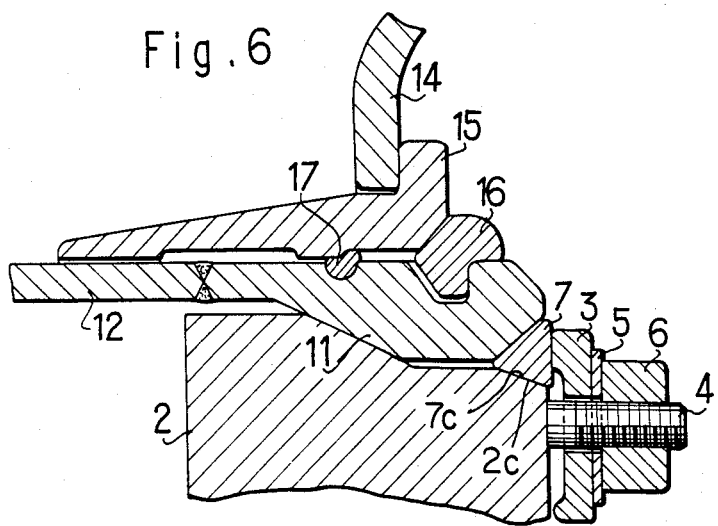

FIGS. 5 and 6 are sectional views of other embodiments of this invention, wherein an annular ring 7 having a wedge-form sectional area or an annular ring 7 having a wedge-form sectional area with a split are provided respectively in place of the wedge member 3' of each letter-L-form clamp piece 3 in FIGS. 3 and 4. Annular ring 7 is shown in FIG. 5 as being inserted between the outer conical surface 11f of the gutter band 11 and an outer cylindrical surface 2b of the outer circumference of the spider hub 2b, as having a conical surface 7a which matingly engages the outer conical surface 3a of the gutter band 11 and an inner cylindrical surface 7b which abuts the outer cylindrical surface 2b of the outer circumference of the spider hub 2. Annular ring 7 is shown in FIG. 6 as having an inner surface 7b which includes a conical surface 7c which matingly engages an outer conical surface 2c formed in the outer cylindrical surface 2b of the outer circumference of the spider hub 2. The side surface of said annular ring 7 is clamped with a a surface 3e of a clamp piece 3. Further, since the clamp piece 3 is not an integral L-form, the exchange of only said annular ring 7 is possible. Furthermore, the ring type structure makes effective contact possible with the whole circumference of the ring due to the elasticity thereof.

In accordance with this invention as described above in detail, the usual gutter band 11 (FIG. 1) is a cantilever supported by only the conical surface 2a at the bottom side of the spider hub 2, while the gutter band 11 according to this invention is supported by both conical surfaces 2a and 3a. Accordingly, the deformation of the gutter band 11 of the wheel rim 1 due to the load decrease, whereby the stress acting on the corner of the gutter portion 11a becomes very small. As a result, the durability of the wheel rim 1 increases and safety is enhanced.

Further, according to this invention, the assembling can be performed by simply exchanging the clamp piece 3 since there is no need to increase the thickness of the gutter band 11 of the wheel rim 1. Therefore, this invention has such practical effect as providing a safer wheel for vehicles without increasing the cost and the weight thereof.

I claim:

1. A wheel rim and spider hub assembly of the flange-removable type for multiple-piece wheel rims, said assembly comprising:
  a. a spider hub having an axial line, a front face, an outer circumference including an outer cylindrical surface extending parallel to the axial line and an inner conical surface having an inclined angle, and a plurality of clamp bolts extending outwardly from the front face;
  b. a wheel rim positioned co-axially around the spider hub and having a cylindrical rim base comprised of:
    (1) a cylindrical, cantilevered gutter band extending parallel to the axial line and having an inner conical surface defined along the surface of the gutter band next to the spider hub and matingly engaging the inner conical surface of the spider hub to thereby support the gutter band, an outer conical surface defined along a surface of the gutter band next to the spider hub and near the front face thereof and including an inclined angle, and a gutter circumferentially defined along the surface thereof remote from the spider hub;
    (2) an annular split locking ring having an upper conical surface including an inclined angle and being adapted to engage the gutter of the gutter band;
    (3) an annular bead seat band having a conical outer edge which matingly engages the upper conical surface of the split locking ring, the band extending parallel to the axial line and being overlappingly positioned parallel to and outwardly from the gutter band on the side thereof remote from the spider hub; and
    (4) an annular side flange outwardly and abuttingly positioned next to the bead seat band,
  wherein the split locking ring holds an annular body formed by the abutted side flange and the bead seat band and engages the annular body along the conical outer edge of the bead seat band;
  c. a plurality of L-shaped clamp pieces, each clamp piece having a wedge member inserted between the outer conical surface of the gutter band of the wheel rim and an outer cylindrical surface of the outer circumference of the spider hub to provide support for the cantilevered gutter band, each wedge member including a conical surface which matingly engages the outer conical surface of the gutter band and an inner cylindrical surface which abuts the outer cylindrical surface of the outer circumference of the spider hub, each clamp piece having a hole for receiving one of the plurality of clamp bolts, and each clamp piece being clamped to one of the plurality of clamp bolts by a clamping means to thereby join the spider hub and the wheel rim into an assembly.

2. An assembly according to claim 1, wherein the outer cylindrical surface of the outer circumference of the spider hub further includes an outer conical surface which begins at the front face and extends inwardly therefrom and has an inclined angle, and wherein the inner surface of the wedge member further includes a conical surface which matingly engages the outer conical surface of the outer circumference of the spider hub.

3. A wheel rim and spider hub assembly of the flange-removable type for multiple-piece wheel rims, said assembly comprising:
  a. a spider hub having an axial line, a front face an outer circumference including an outer cylindrical surface extending parallel to the axial line and an inner conical surface having an inclined angle, and a plurality of clamp bolts extending outwardly from the front face;
  b. a wheel rim positioned co-axially around the spider hub and having a cylindrical rim base comprised of:
    (1) a cylindrical, cantilevered gutter band extending parallel to the axial line and having an inner conical surface defined along the surface of the gutter band next to the spider hub and matingly engaging the inner conical surface of the spider hub to thereby support the gutter band, an outer conical surface defined along a surface of the gutter band next to the spider hub and near the front face thereof and including an inclined angle, and a gutter circumferentially defined along the surface thereof remote from the spider hub;
    (2) an annular split locking ring having an upper conical surface including an inclined angle and being adapted to engage the gutter of the gutter band;
    (3) an annular bead seat band having a conical outer edge which matingly engages the upper conical surface of the split locking ring, the band extending parallel to the axial line and being overlappingly positioned parallel to and outwardly from the gutter band on the side thereof remote from the spider hub; and
    (4) an annular side flange outwardly and abuttingly positioned next to the bead seat band,
  wherein the split locking ring holds an annular body formed by the abutted side flange and the bead seat band and engages the annular body along the conical outer edge of the bead seat band;

c. an annular ring having a wedge-form cross-sectional area which is inserted between the outer conical surface of the gutter band of the wheel rim and an outer cylindrical surface of the outer circumference of the spider hub and which includes a conical surface which matingly engages the outer conical surface of the gutter band and an inner cylindrical surface which abuts the outer cylindrical surface of the outer circumference of the spider hub; and d. a plurality of clamp pieces, each clamp piece having a surface which engages the annular ring and holds the ring in position and having a hole for receiving one of the plurality of clamp bolts, and each clamp piece being clamped to one of the plurality of clamp bolts by a clamping means to thereby join the spider hub, the wheel rim and the annular ring into an assembly.

4. An assembly according to claim 3, wherein the outer cylindrical surface of the outer circumference of the spider hub further includes an outer conical surface which begins at the front face and extends inwardly therefrom and has an inclined angle, and wherein the inner cylindrical surface of the annular ring further includes a conical surface which matingly engages the outer conical surface of the outer circumference of the spider hub.

5. An assembly according to claim 4, wherein the wedge-form cross-sectional area of the annular ring further includes a split along a surface which engages the plurality of clamp pieces, and wherein a surface of each of the plurality of clamp pieces which engages the annular ring is further adapted to matingly engage the split thereof.

* * * * *